US012667046B2

(12) United States Patent
Tian

(10) Patent No.: US 12,667,046 B2
(45) Date of Patent: Jun. 30, 2026

(54) MOWER AND OUTDOOR WORK TOOL

(71) Applicant: Greenworks (Jiangsu) Co., Ltd., Changzhou (CN)

(72) Inventor: Bing Tian, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 385 days.

(21) Appl. No.: 18/349,933

(22) Filed: Jul. 10, 2023

(65) Prior Publication Data

US 2023/0345871 A1 Nov. 2, 2023

Related U.S. Application Data

(63) Continuation of application No. PCT/CN2022/073062, filed on Jan. 21, 2022.

(30) Foreign Application Priority Data

| | | |
|---|---|---|
| Jan. 22, 2021 | (CN) | 202110086967.6 |
| Jan. 22, 2021 | (CN) | 202120176627.8 |
| Jan. 22, 2021 | (CN) | 202120177313.X |
| Jun. 10, 2021 | (CN) | 202121292572.3 |

(51) Int. Cl.
*A01D 34/74* (2006.01)
*A01D 34/54* (2006.01)

(52) U.S. Cl.
CPC ............. *A01D 34/74* (2013.01); *A01D 34/54* (2013.01)

(58) Field of Classification Search
CPC ................................ A01D 34/74; A01D 34/54
See application file for complete search history.

(56) References Cited

U.S. PATENT DOCUMENTS

| | | | | |
|---|---|---|---|---|
| 2,882,063 A | | 4/1959 | Strasel | |
| 3,040,830 A | * | 6/1962 | Lamprecht | A01D 34/74 |
| | | | | 56/10.8 |
| 3,147,987 A | * | 9/1964 | Ritums | A01D 34/74 |
| | | | | 56/255 |
| 4,175,669 A | * | 11/1979 | Housholder | B65D 85/66 |
| | | | | 250/517.1 |
| 4,715,168 A | * | 12/1987 | Oxley | A01D 34/662 |
| | | | | 56/15.8 |
| 2011/0078990 A1 | * | 4/2011 | Vachal | A01D 34/74 |
| | | | | 280/43.17 |

FOREIGN PATENT DOCUMENTS

| | | | | |
|---|---|---|---|---|
| CN | 212278926 | * | 1/2021 | A01D 67/00 |

OTHER PUBLICATIONS

CN212278926 (Year: 2021).*

* cited by examiner

*Primary Examiner* — Cathleen R Hutchins

(57) ABSTRACT

The disclosure provides a mower and an outdoor work tool. The mower includes a main body, a traveling wheel assembly, a handle assembly, a blade, and a first height adjustment device. The traveling wheel carries the main body and may drive the main body to move on the ground. The traveling wheel assembly includes a wheel axle. The handle assembly is connected with the main body. The first height adjustment device is provided with a height adjustment fixing base which is connected with the main body. The height adjustment fixing base is provided with a plurality of first through holes. A wheel axle connected with the mower is arranged to be selectively placed in the first through hole, and the wheel axle is non-rotatably housed in the first through hole.

17 Claims, 11 Drawing Sheets

MOWER AND OUTDOOR WORK TOOL

TECHNICAL FIELD

The disclosure relates to an outdoor work tool, specifically relates to a mower and an outdoor work tool which may adjust a cutting height.

BACKGROUND

Mower is an outdoor work tool used to lawncare. It includes a blade, a casing, a power head, a traveling mechanism, a handle assembly, a collection device, a control device and so on. It is widely used in garden decoration pruning, grass pruning, urban streets, greening scenic spots, pastoral pruning, and field weeding, especially in the grassland in the park or grassland, football field, private villa garden and vegetation of agriculture, forestry and animal pastures, etc. When using, the mowing height after mowing need to be determined according to the requirements of the lawn.

When mowing, the vegetation should be pruned to a specified height according to different vegetation pruning requirements. Pruning too short will affect the growth of vegetation, and pruning too high will affect the appearance. Generally, a height adjustment operating handle is used to adjust the height of the chassis and then control the pruning height. The structure of the height adjustment operating handle on the market now contains many components, which potentially increases the cost and complexity of the mower. A variety of tools are required when the components need to be disassembled for replacement or maintenance. Moreover, since the height adjustment device is a commonly used structure of mowers, frequent use will cause component wear and tear, which will reduce the service life of mowers.

In view of this, it is indeed necessary to improve the conventional height adjustment mechanism to solve the problems mentioned above.

SUMMARY

The disclosure provides a mower and an outdoor work tool, in order to solve the problems of complex structure, high cost, and slow height adjustment speed of the height adjustment device of outdoor work tools in the conventional art.

The disclosure provides a mower. The mower includes: a main body, a traveling wheel assembly, a handle assembly, a blade, and a first height adjustment device. The traveling wheel assembly carries the main body and is capable of driving the main body to move on ground. The traveling wheel assembly includes a wheel axle. The handle assembly is connected with the main body. The first height adjustment device includes: a height adjustment fixing base. The height adjustment fixing base is connected with the main body. The height adjustment fixing base is provided with a plurality of first through holes. The wheel axle connected with the mower is placeable in the first through hole, and the wheel axle is non-rotatably housed in the first through hole.

In an embodiment of the disclosure, the first height adjustment device further includes a fixing component, after the wheel axle passes through the first through hole, the fixing component is fixedly matched with a part of the wheel axle passing through the first through hole to connect the wheel axle with the height adjustment fixing base.

In an embodiment of the disclosure, the fixing component is a steel-ball pin, the wheel axle is correspondingly provided with a pin hole for the steel-ball pin to pass through, and a cross section of the steel-ball pin is D-shaped, O-shaped or square-shaped.

In an embodiment of the disclosure, the first through holes are arranged at intervals in an up and down direction, the wheel axle may be matched with different first through holes to adjust different operation heights of the mower.

In an embodiment of the disclosure, the plurality of first through holes are arranged in two rows spaced at intervals in a horizontal direction, and the two rows of first through holes are staggered and arranged in a height direction.

In an embodiment of the disclosure, a cross section of the first through hole is D-shaped, and at least part of a cross section of the wheel axle is D-shaped corresponding to the cross section of the first through hole.

In an embodiment of the disclosure, the height adjustment fixing base is further provided with a holding part, the holding part is hung and extends from a top of the height adjustment fixing base toward the main body, a holding through hole is arranged on the holding part, and a fastener is inserted in the holding through hole to connect the holding part with the main body.

In an embodiment of the disclosure, the height adjustment fixing base is further provided with a protrusion to limit the main body in an up and down direction and a horizontal limiting step to limit the main body in a horizontal direction.

In an embodiment of the disclosure, the main body is provided with a concave part corresponding to the protrusion on the height adjustment fixing base, and the main body is further provided with a main body step corresponding to the horizontal limiting step on the height adjustment fixing base.

In an embodiment of the disclosure, a circular ring is arranged on the wheel axle, and the circular ring is located in a middle of the wheel axle to prevent the wheel axle from moving.

In an embodiment of the disclosure, the mower further includes a second height adjustment device. The second height adjustment device includes: a wheel axle side plate, a gear plate, and an operating component. A bottom of the wheel axle side plate is fixedly connected with one end of a connecting shaft of the mower, and the other end of the connecting shaft is detachably connected with a rear wheel of the mower. The gear plate is arranged on one side of the wheel axle side plate and provided with a plurality of gear grooves with different heights. The operating component is arranged on the other side of the wheel axle side plate, and is capable of being operated to match the gear grooves with different heights. The operating component includes a positioning part passing through the wheel axle side plate and matched with the gear plate, and the operating component is operable to move on the wheel axle side plate to enable the positioning part to be located in or out of the gear grooves.

In an embodiment of the disclosure, the operating component further includes a matching part extending in an up and down direction and matched with the wheel axle side plate, an extension part extending upward from the matching part, and an operating handle extending upward from the extension part, and the positioning part is arranged on the matching part.

In an embodiment of the disclosure, a strip-shaped first sliding groove is opened on the matching part, and the operating component is movably connected in the up and down direction with the wheel axle side plate through the first sliding groove.

In an embodiment of the disclosure, a protrusion column is arranged on the wheel axle side plate, and after the protrusion column passes through the first sliding groove, the protrusion column is connected with the operating member through a nut.

In an embodiment of the disclosure, there are two first sliding grooves, the two first sliding grooves are arranged at intervals in the up and down direction, there are two protrusion columns, the two protrusion columns are correspondingly arranged at intervals in the up and down direction, and the positioning part is arranged between the two first sliding grooves.

In an embodiment of the disclosure, the gear plate is arc-shaped, the gear groove is arranged on an inner wall of the gear plate along an arc-shaped direction of the gear plate, and an opening of the gear groove faces away from a ground direction. The second height adjustment device further includes an elastic component elastically arranged between the operating component and the wheel axle side plate, the wheel axle side plate is provided with a second through hole and a housing hole to house the elastic component, one end of the elastic component is connected with the second through hole, and the other end thereof is connected with the first sliding groove on a side away from the operating handle on the matching part.

In an embodiment of the disclosure, the gear plate is arc-shaped, each of the gear grooves is arranged on an inner wall of the gear plate along an arc-shaped direction of the gear plate, and an opening of each of the gear grooves faces a ground direction. The second height adjustment device further includes an elastic component elastically arranged between the operating component and the wheel axle side plate, the wheel axle side plate is provided with a housing hole to house the elastic component, a bottom of the housing hole is provided with a protrusion block, the elastic component is sleeved on the protrusion block, and one end of the elastic component abuts against the operating component.

In an embodiment of the disclosure, the second height adjustment device further includes a pushing slider arranged between the elastic component and the operating component, the housing hole on the wheel axle side plate is further used to house the pushing slider, and the pushing slider includes a mounting part housed in the housing hole and a resisting part protruding from the wheel axle side plate to abut and match the operating component.

In an embodiment of the disclosure, the housing hole to house the elastic component and the pushing slider is T-shaped, and after the second height adjustment device is assembled, the pushing slider is only capable of moving at a lower end of the housing hole.

In an embodiment of the disclosure, a strip-shaped second sliding groove is arranged on the wheel axle side plate, after passing through the second sliding groove, the positioning part is matched with the gear plate, and the positioning part is capable of moving in an up and down direction in the second sliding groove.

The disclosure further provides an outdoor work tool. The outdoor work tool includes: a main body, a traveling wheel assembly, a handle assembly, a first height adjustment device, and a second height adjustment device. The traveling wheel assembly carries the main body and is capable of driving the main body to move on ground. The traveling wheel assembly includes a wheel axle. The handle assembly is connected with the main body. The first height adjustment device includes a height adjustment fixing base. The height adjustment fixing base is connected with the main body. The height adjustment fixing base is provided with a plurality of first through holes, and the first through holes is separated from each other and parallel to each other. The wheel axle connected with the outdoor work tool is placeable in the first through hole, and the wheel axle is non-rotatably housed in the first through hole. The first height adjustment device and the second height adjustment device are respectively connected with a front traveling wheel and a rear traveling wheel of the outdoor work tool, so as to respectively realize an adjustment of a cutting height.

As mentioned above, the mower and outdoor work tool of the disclosure have the following beneficial effects: the mower or outdoor work tool is provided with a height adjustment fixing base that may be fixedly connected with the wheel axle at a plurality of different heights, and the wheel axle is non-rotatably housed in the first through hole of the height adjustment fixing base, so that an adjustment of the wheel axle at different heights may be realized, and a working height of the mower or the outdoor work tool may be adjusted, which has the advantages of fast height adjustment, simple structure, safety and reliability.

PART NUMBER DESCRIPTION

100—outdoor work tool, 10—main body, 11—blade, 12—motor, 13—collection bag, 14—rear block, 15—concave part, 16—main body step, 30—handle assembly, 20—traveling wheel, 21—front wheel, 22—rear wheel, 221—connecting shaft, 23—wheel axle, 211—pin hole, 230—upper side wall, 231—circular ring, 24—nut, 40—first height adjustment device, 41—height adjustment fixing base, 411—holding part, 412—height adjustment part, 413—height adjustment through hole, 414—holding through hole, 415—protrusion, 416—horizontal limiting step, 42—fixing component, 50—second height adjustment device, 51—wheel axle side plate, 510—protrusion block, 511—housing hole, 512—second sliding groove, 513—protrusion part, 514—second through hole, 52—gear plate, 520—pivot shaft, 521—gear groove, 522—gear mark, 53—operating component, 531—positioning part, 532—matching part, 533—extension part, 534—operating handle, 535—first sliding groove, 54—elastic component, 55—pushing slider, 551—mounting part, 552—resisting part, 60—fastener.

DETAILED DESCRIPTION

The following specific examples illustrate the implementation of the disclosure. Those skilled in the art may easily understand other advantages and effects of the disclosure from the content disclosed in this specification.

Please refer to FIG. 1 through FIG. 11. It should be noted that the structure, scale, size, etc. of the drawings in this specification are merely for illustration of the disclosed content for understanding and reading by those skilled in the art, and do not intend to limit the restrictive conditions under which the disclosure can be implemented, so it has no technical significance. Any structural modification, proportional relationship change or size adjustment should still be within the scope of the technical content disclosed in the disclosure, without affecting the effects and objectives that can be achieved by the disclosure. At the same time, the terms such as "upper", "lower", "left", "right", "middle" and "one" cited in this specification are only for the convenience of description and are not used to limit the scope of the disclosure. The change or adjustment of the relative relationship should also be regarded as the applicable scope of the disclosure without substantial change in the technical content.

Figure 1:
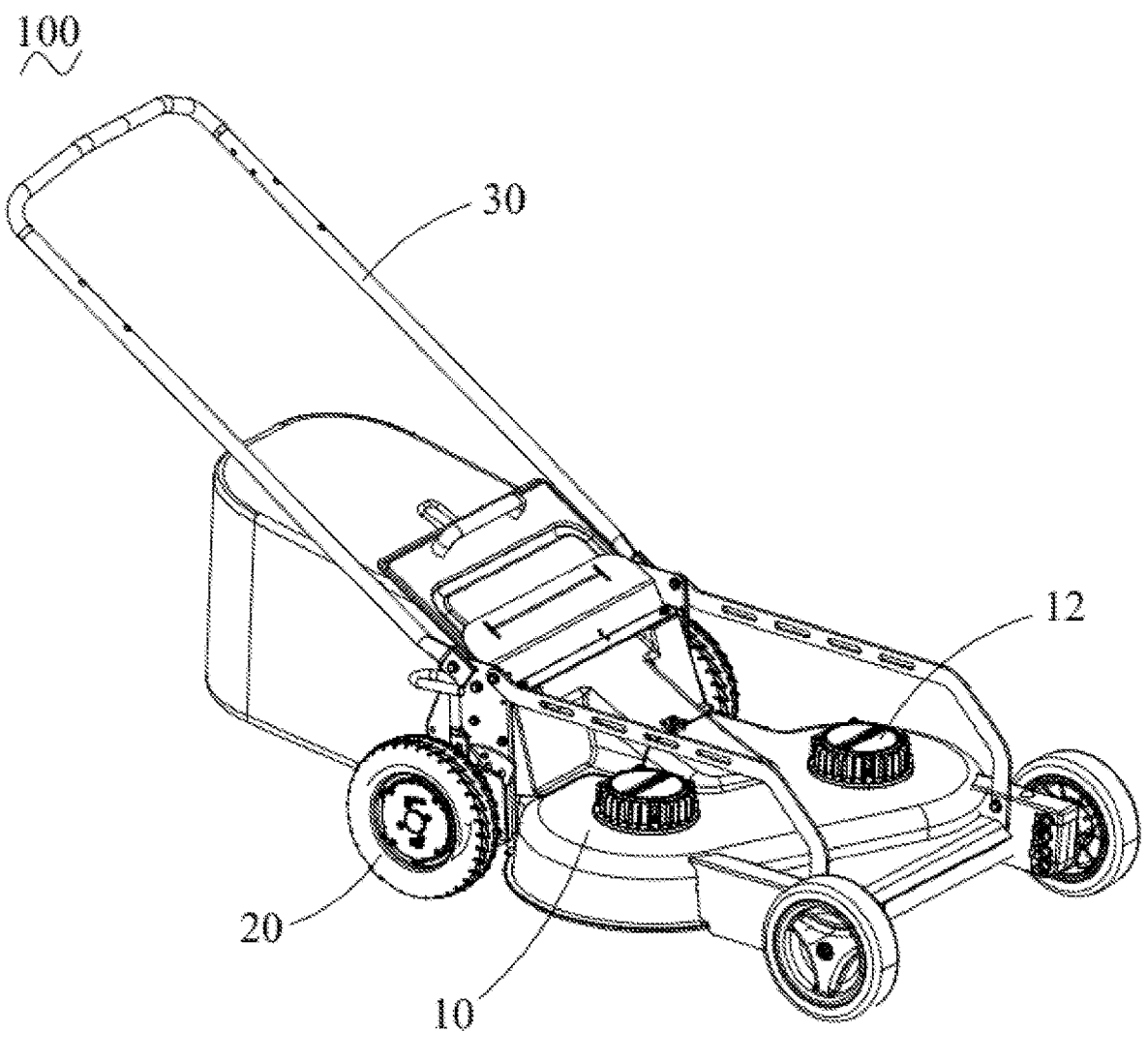
FIG. 1 is a perspective view of an outdoor work tool disclosed in an embodiment of the disclosure.
Figure 2:
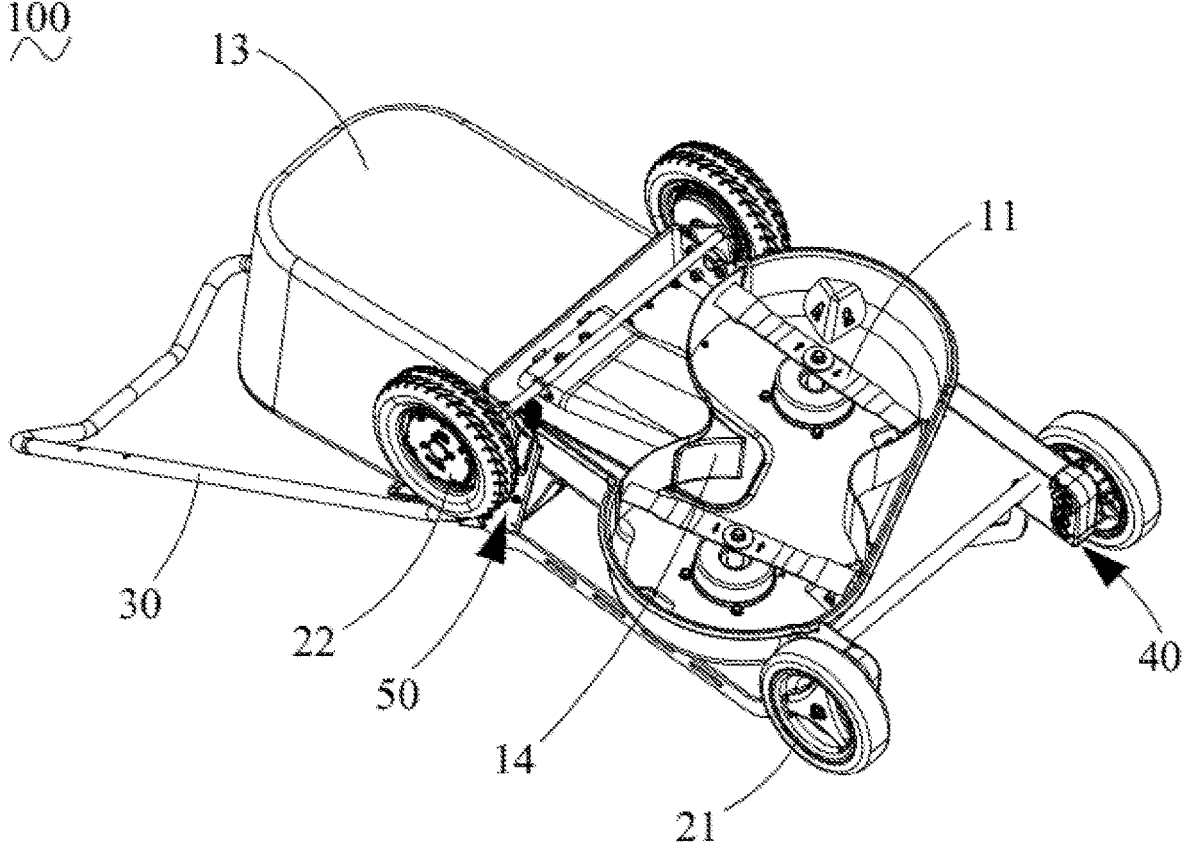
FIG. 2 is a perspective view of the outdoor work tool shown in FIG. 1 from another angle.
Figure 3:
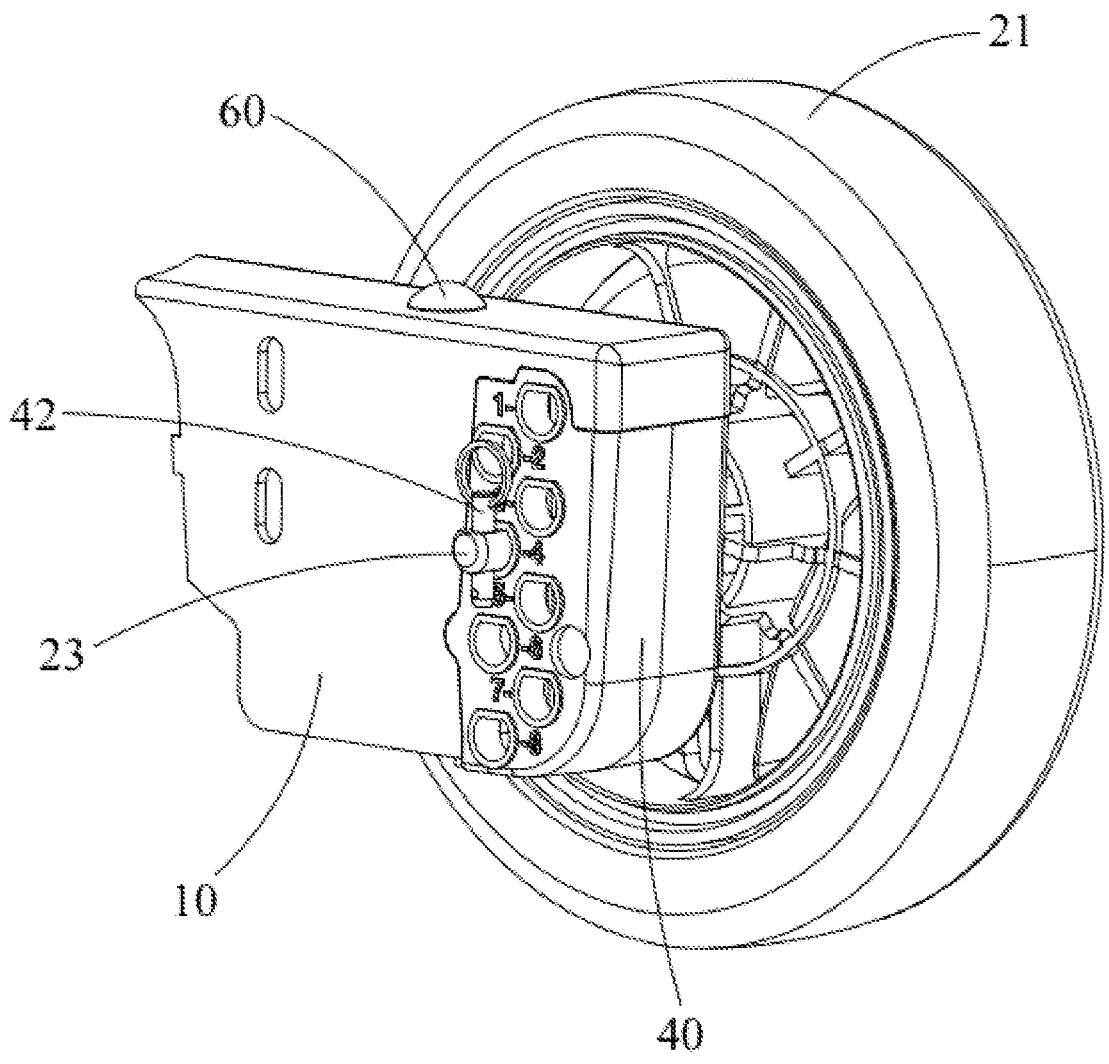
FIG. 3 is a perspective view of one of the front wheels of the outdoor work tool shown in FIG. 1 when assembled with a first height adjustment device and part of a main body.
Figure 4:
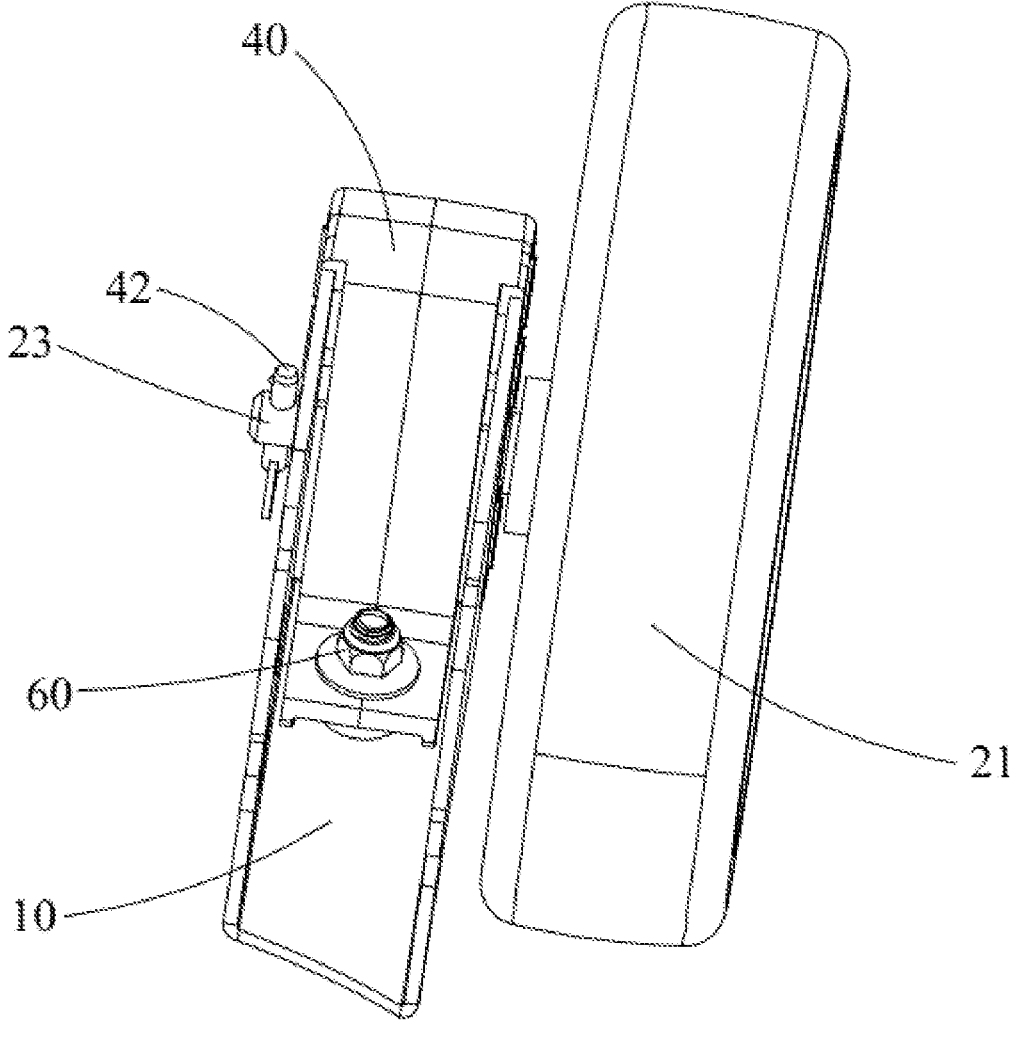
FIG. 4 is a schematic view of FIG. 3 from another angle.
Figure 5:
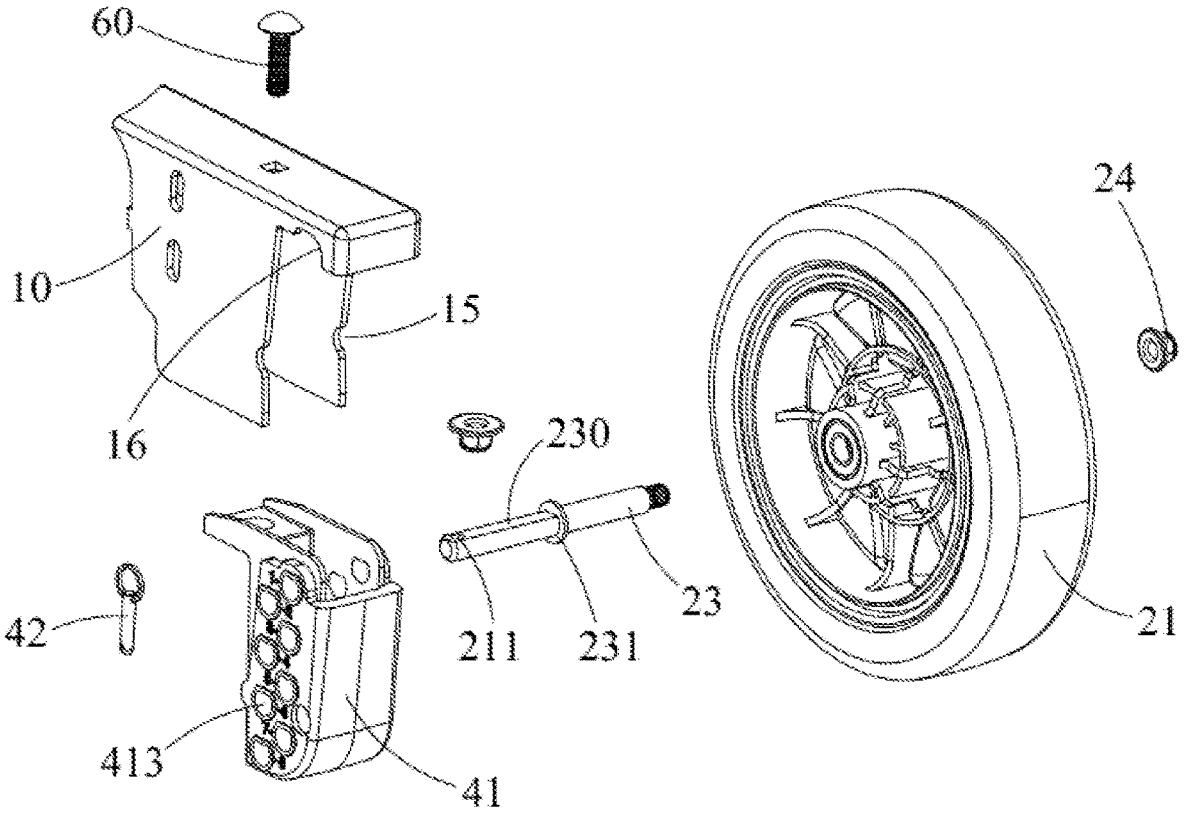
FIG. 5 is an exploded schematic diagram of FIG. 3.
Figure 6:
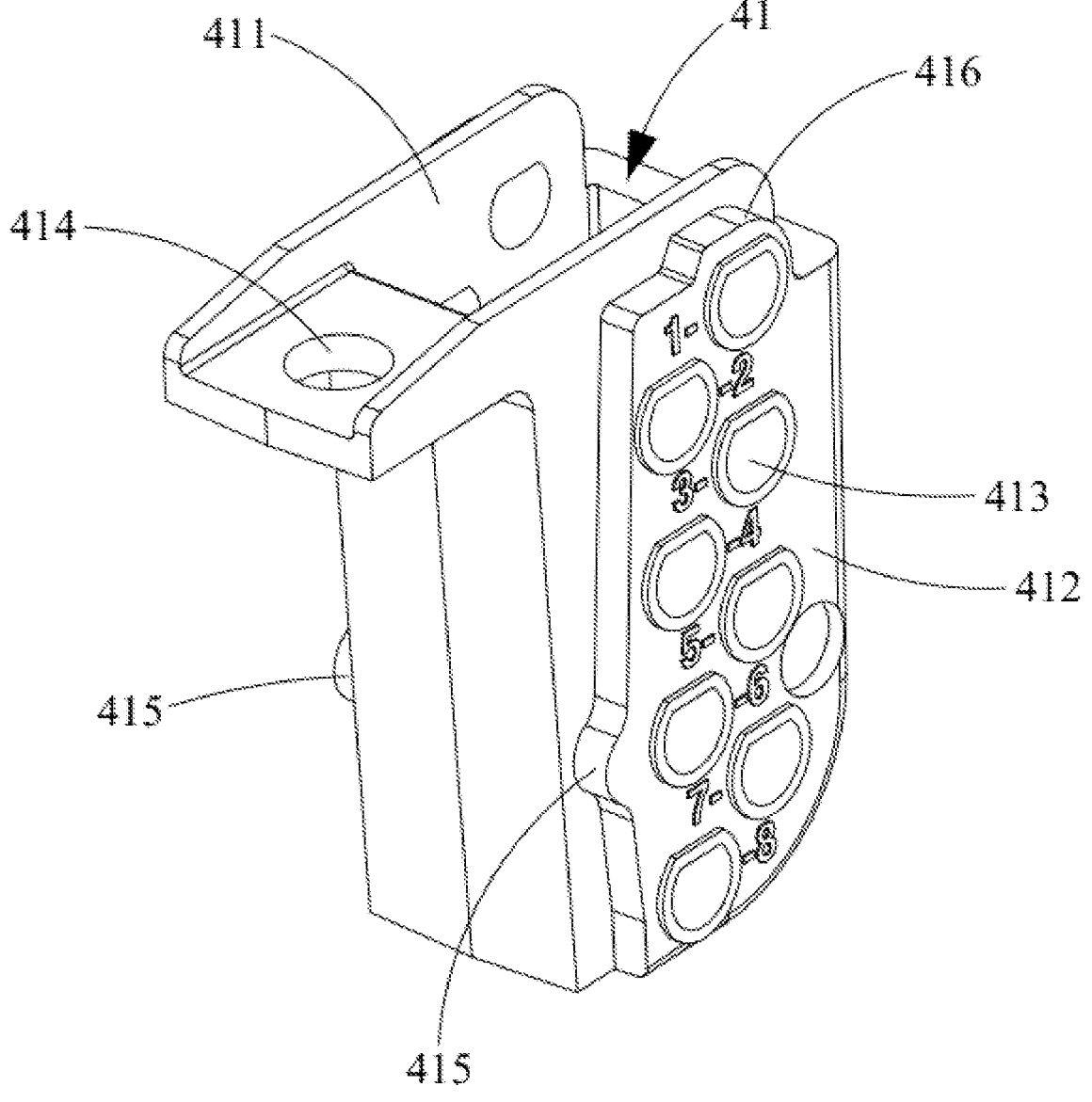
FIG. 6 is a perspective view of a height adjustment fixing base in FIG. 5.

Please refer to FIG. 1 and FIG. 2. The disclosure provides an outdoor work tool 100. The outdoor 100 includes a main body 10, a traveling wheel assembly and a handle assembly. The traveling wheel assembly carries the main body 10 and may drive the main body 10 to move on ground. The handle assembly 30 is connected with the main body 10 for allowing a user to walk behind the outdoor work tool. In this embodiment, the outdoor work tool 100 is a dual-blade mower, which is provided with two blades 11. Each of the two blades 11 is independently driven by a motor 12, and the two blades 11 are arranged staggered back and forth. A rear of the dual-blade mower is provided with a collection bag 13 and a rear block 14, so that the dual-blade mower has a grass collection function and a grass shredding function. Of course, the outdoor work tool 100 may also be a single-blade mower, other types of outdoor garden tools or non-outdoor garden tools, which are not limited here. Hereinafter, a structure of the mower will be described in detail by taking the outdoor work tool 100 as a mower as an example.

The traveling wheel assembly includes a traveling wheel 20 and a wheel axle 23. The traveling wheel 20 includes a pair of front wheels 21 and a pair of rear wheels 22. The pair of rear wheels 22 are driving wheels, and each driving wheel 22 is provided with a hub motor (not labeled). The mower further includes a height adjustment device. The height adjustment device specifically includes a first height adjustment device 40 for adjusting a working height of the mower through the front wheels 21 and a second height adjustment device 50 for adjusting the working height of the mower through the rear wheels 22. In other words, there are two height adjustment devices on the mower, namely the first height adjustment device 40 and the second height adjustment device 50. Adjustment functions of the two height adjustment devices are independent of each other, thereby ensuring a reliability of a height adjustment of the mower, and meeting requirements of long working hours and large working areas of commercial mowers. In some embodiments, each front wheel 21 is provided with the corresponding first height adjustment device 40, and the two rear wheels 22 share the second height adjustment device 50.

This is because mowers, especially commercial mowers, are relatively large and heavy. If a usual height adjustment mechanism (ie, a linkage height adjustment mechanism for front and rear wheels) is used, it will cause more wear or failure due to a heavy weight of the commercial mower. Therefore, a method of separately adjusting a height of the front and rear wheels may ensure that the heavy weight of the mower will not cause wear or failure.

Please refer to FIG. 3 through FIG. 6. The first height adjustment device 40 is detachably mounted between the main body 10 and the corresponding front wheels 21 to adjust a working height of the main body 10. One end of the wheel axle 23 is matched with the front wheel 21 and the other end of the wheel axle 23 is matched with the first height adjustment device 40. The first height adjustment device 40 includes a height adjustment fixing base 41 connected with the main body 10. A first end of the wheel axle 23 passes through a shaft center hole of the front wheel 21 and is locked and fixed by a nut 24, and a second end of the wheel axle 23 may be fixedly connected with the height adjustment fixing base 41 at a plurality of different heights. The height adjustment fixing base 41 includes a holding part 411 fixedly connected with the main body 10 and a height adjustment part 412 fixedly connected with the other end of the wheel axle 23 at a plurality of different heights. The second end of the wheel axle 23 is non-rotatably housed in the height adjustment part 412.

The first height adjustment device 40 further includes a fixing component 42. After the second end of the wheel axle 23 passes through the height adjustment part 412, the fixing component 42 may be fixedly matched with a part of the wheel axle 23 passing through the height adjustment part 412 to firmly connect the wheel axle 23 with the height adjustment part 412. In this embodiment, the fixing component 42 is a steel-ball pin. The wheel axle 23 is correspondingly provided with a pin hole 211 for the steel-ball pin 42 to pass through. A cross section of the steel ball-pin 42 is D-shaped, O-shaped, square-shaped, or other suitable shapes. After the steel-ball pin 42 passes through the pin hole 211, the wheel axle 23 may be prevented from being pulled out of the height adjustment fixing base 41.

The wheel axle 23 is arranged in a cylindrical shape as a whole. From a perspective of normal use of the wheel axle 23, an upper side wall 230 of the wheel axle 23 is flat plane. On one hand, it enables at least part of the cross section of the wheel axle 23 is D-shaped, and not only facilitates to pass through the height adjustment part 412, but also match the height adjustment part 412 better. On the other hand, it is also convenient to arrange the pin hole 211 on the upper side wall 230, so that the steel-ball pin 42 may pass through the entire wheel axle 23 and prevent the wheel shaft 23 from being pulled out of the height adjustment fixing base 41. A circular ring 231 is further provided in a middle of the wheel axle 23. After the wheel axle 23 passes through the height adjustment fixing base 41, the circular ring 231 and the steel-ball pin 42 on both sides of the height adjustment fixing base 41 may be respectively used to limit a position of the wheel axle 23, so that the wheel axle 23 is prevent from moving in a direction along an axis of the wheel axle 23 itself (which means to prevent the wheel axle 23 from moving left and right), then after the front wheel 21 is fixed to the first height adjustment device 40, the front wheel 21 may also be prevented from moving left and right.

The height adjustment part 412 is provided with a plurality of first through holes 413 spaced in a vertical direction and parallel to each other. The first through holes 413 may also be called height adjustment through holes. An extension direction of each height adjustment through hole 413 is parallel to a ground direction. The wheel axle 23 is configured to be selectively placed in different height adjustment through holes 413, and the wheel axle 23 is non-rotatably housed in the height adjustment through holes 413, so as to adjust different working heights of the main body 10. The plurality of height adjustment through holes 413 are arranged in two rows spaced at intervals in a horizontal direction, and the two rows of height adjustment through holes 413 are staggered in a height direction. In this way, a space of the height adjustment part 412 may be fully utilized, and more height adjustment through holes 413 may be arranged, so that the mower has more options of working heights. The height adjustment fixing base 41 may be made of a light alloy, such as aluminum alloy or magnesium alloy, or may be made of a high-strength polymer, such as nylon.

In an embodiment of the disclosure, a cross section of the height adjustment through hole 413 is D-shaped to correspond to the D-shaped cross section of the second end of the wheel axle 23. Of course, in other embodiments, the cross section of the height adjustment through hole 413 and the second end of the wheel axle 23 may also be other shapes, as long as it can ensure that the wheel axle 23 will not rotate relative to the height adjustment through hole 413, which is not limited here.

In this embodiment, the holding part 411 is hung and extends from a top of the height adjustment part 412 toward the main body 10. The holding part 411 is provided with a holding through hole 414 for the fastener 60 to pass through to firmly connect the holding part 411 with the main body 10. The fastener 60 may be a bolt and a nut, or other suitable structure capable of holding and connecting, which is not limited here.

The height adjustment part 412 is provided with a protrusion 415, and the main body 10 is provided with a concave part 15 corresponding to the protrusion 415, so that when assembling the height adjustment fixing base 41 and the main body 10, the protrusion 415 and the concave part 15 may can be used to be matched with each other to realize a limit in an up and down direction. The height adjustment part 412 is further provided with a horizontal limiting step 416, and the main body 10 is provided with a main body step 16 corresponding to the horizontal limiting step 416, so that when assembling the height adjustment fixing base 41 and the main body 10, the horizontal limiting step 416 and the main body step 16 may be matched with each other to realize a limit in a horizontal direction.

When in use, the pair of front wheels 21 is directly inserted into the height adjustment fixing base 41 of the corresponding first height adjustment device 40 through the corresponding wheel axle 23, then the steel-ball pin 42 and the pin hole 211 are matched with each other to realize a fixation, which has advantages of rapid height adjustment, simple structure, safety and reliability.

Please refer to FIG. 7 through FIG. 11 and in combination with FIG. 1 and FIG. 2, the second height adjustment device 50 is mounted on the main body 10 and directly acts on one of the rear wheels 22 to adjust the working height of the main body 10.

The second height adjustment device 50 includes a wheel axle side plate 51 matched with the main body 10, a gear plate 52 which is arranged on one side of the wheel axle side plate 51 and may be fixed on the main body 10, and an operating component 53 arranged on the other side of the wheel axle side plate 51. The operating component 53 is substantially located above the wheel axle side plate 51. A bottom of the wheel axle side plate 51 is fixedly connected with one end of a connecting shaft 221, and the other end of the connecting shaft 221 is connected with the other rear wheel 22, so that when the second height adjustment device 50 is operated, a height of the two rear wheels 22 can be adjusted simultaneously. The wheel axle side plate 51 is pivotally connected with the main body 10 of the mower at a position different from the connecting shaft 221 so that the wheel axle side plate 51 may pivotally rotate relative to the main body 10 of the mower.

Figure 7:
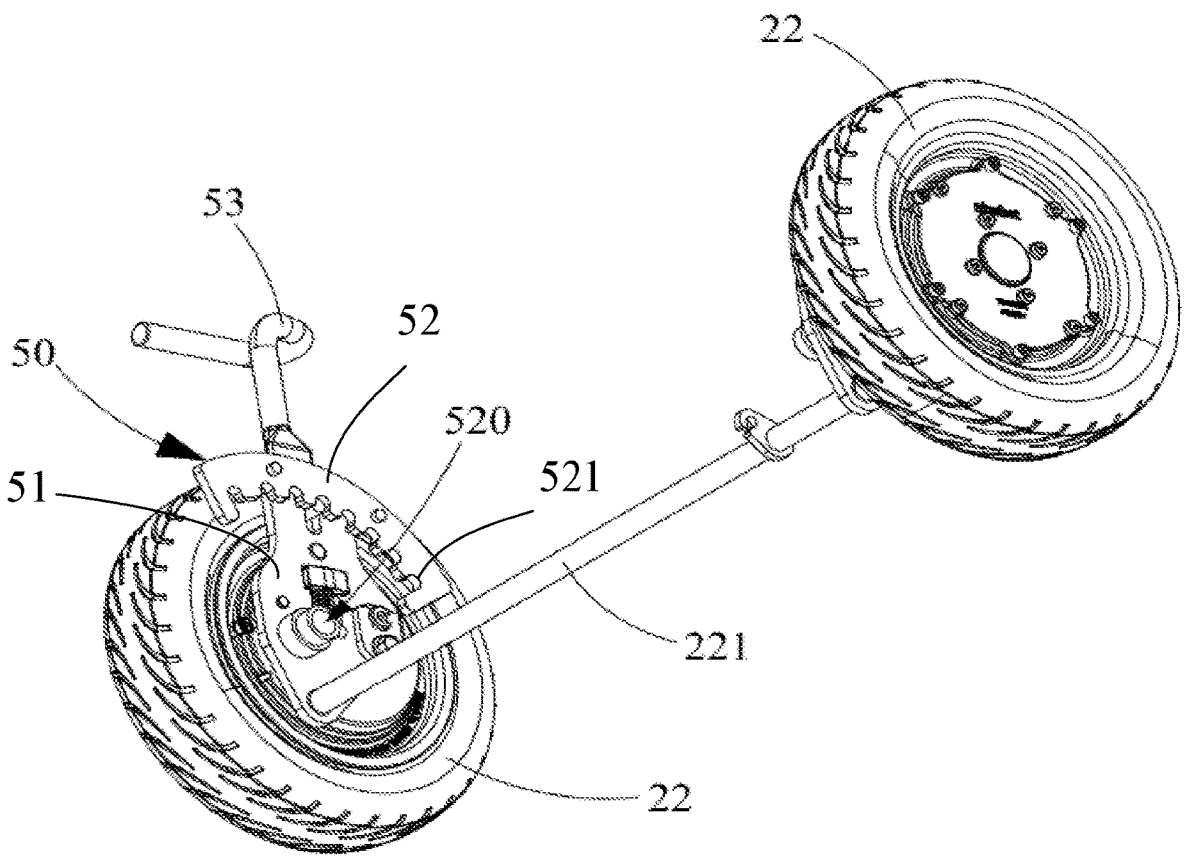
FIG. 7 is a perspective view of a rear wheel of the outdoor work tool shown in FIG. 1 when assembled with a second height adjustment device.

Please refer to FIG. 7, the gear plate 52 is provided with a plurality of gear grooves 521 with different heights. The gear plate 52 is in an arc-shape. Each gear groove 521 is arranged on an inner wall of the gear plate 52 along an arc of the gear plate 52, and a center of the arc coincides with a pivot shaft 520 of the wheel axle side plate 51, so that a distances from each gear groove 521 to the pivot shaft 520 of the wheel axle side plate 51 are consistent. The operating component 53 may be operated by the user to match the gear groove 521 with different heights. The gear groove 521 is a positioning notch arranged at a bottom of the gear plate 52. In this embodiment, there are eight gear grooves 521, and they are evenly distributed on an arc side wall of the gear plate 52. An opening of each gear groove 521 on the arc side wall of the gear plate 52 are arranged as rounded corners. This structure may facilitate a positioning part 531 to be embedded in the gear groove.

In a process of adjusting a height of a chassis of the mower, the positioning part 531 may be stably inserted into the gear groove 521, which may prevent the positioning part 531 from being separated from the gear groove 521. A structural of multiple gear grooves 521 enables an adjustment of the height of the chassis to be diversified, so that the mower is suitable for different outdoor design requirements and increases applicability.

Figure 9:
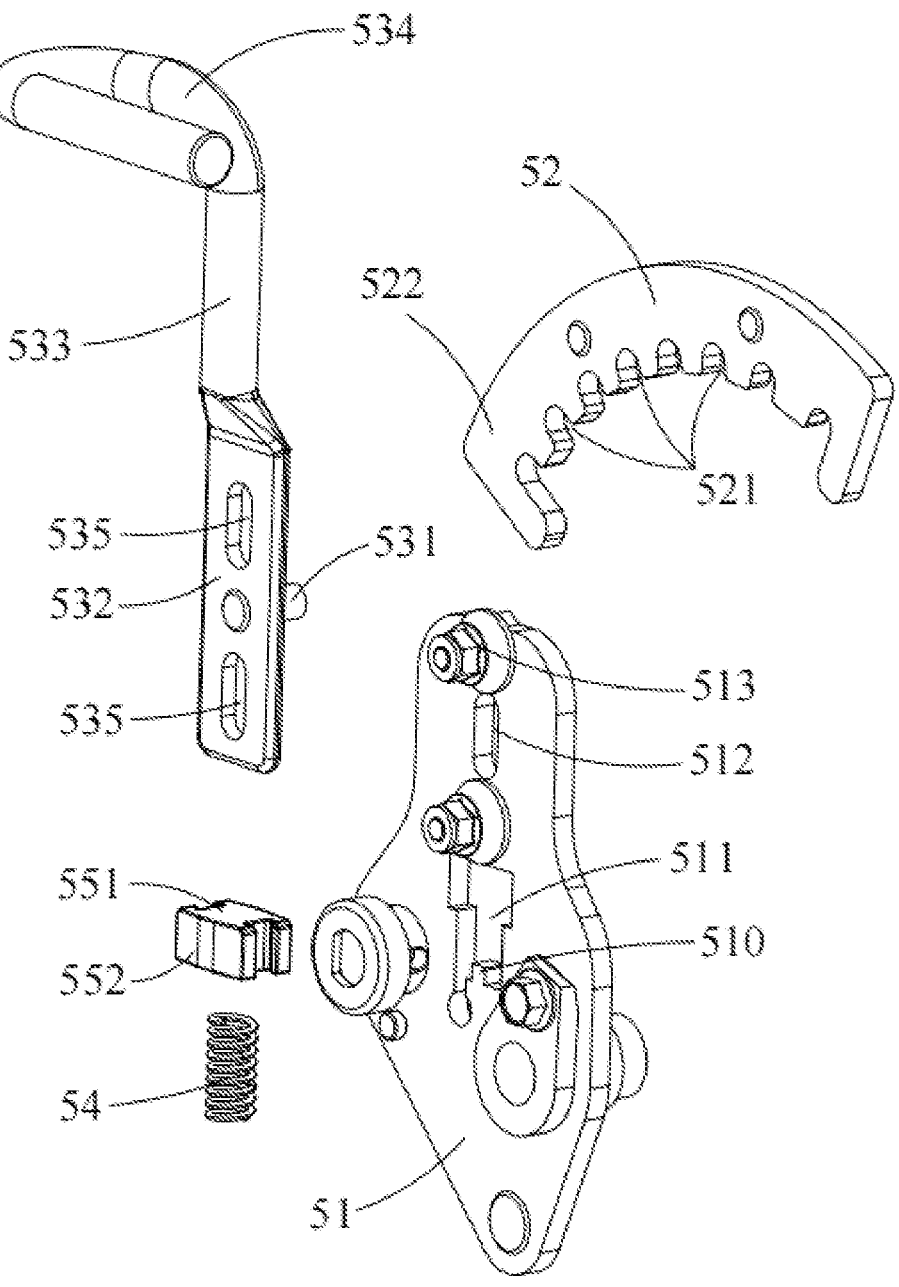
FIG. 9 is an exploded schematic view of the second height adjustment device shown in FIG. 8.

Please refer to FIG. 9, an arc outer side wall of the gear plate 52 is further marked with gear marks 522, and the number and positions of the gear marks 522 correspond to the gear grooves 521. The gear marks 522 are convenient for the user to intuitively observe an approximate position of the height adjustment of the chassis of the mower, so that the user may move the positioning part 531 on an adjustment lever to the gear groove 521 corresponding to the gear mark 522 according to actual needs, thereby increasing convenience and accuracy of the height adjustment of the chassis.

Figure 8:
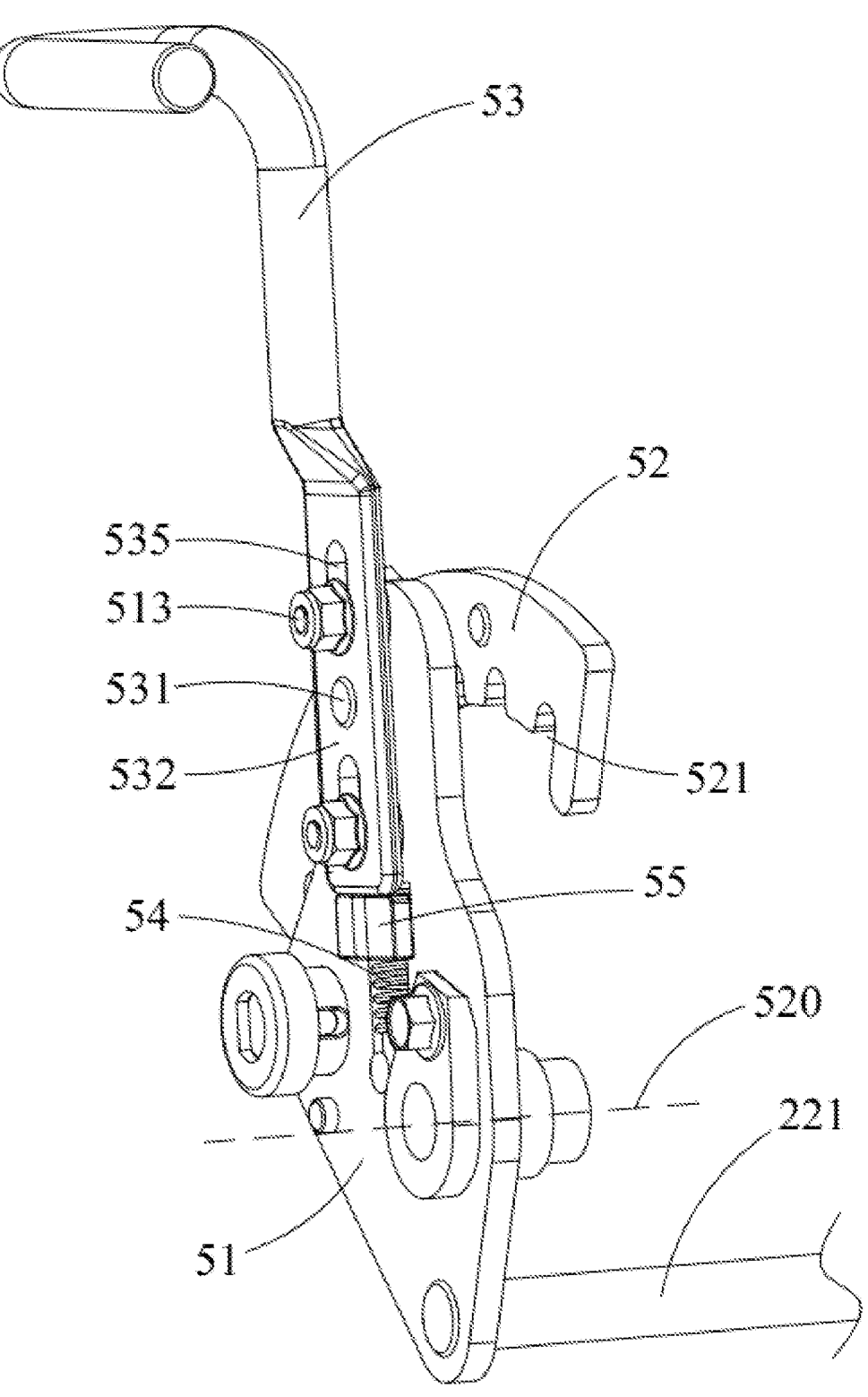
FIG. 8 is a perspective view of the second height adjustment device in FIG. 7.

Please refer to FIG. 8 through FIG. 9, the operating component 53 includes the positioning part 531, a matching part 532, an extension part 533 and an operating handle 534.

The positioning part 531 penetrates the wheel axle side plate 51 and matches the gear groove 521. When an opening of the gear groove 521 faces the ground direction, the second height adjustment device 50 further includes an elastic component 54 elastically arranged between the operating component 53 and the wheel axle side plate 51. When there is no external force to control operating component 53 (which means in an initial state), an elastic force of the elastic component 54 keeps the positioning portion 531 in the corresponding gear groove 521. After the operating component 53 is pressed down, the elastic component 54 is compressed until the positioning part 531 is removed from the gear groove 521 for gear shifting. In other words, the operating component 53 is operable to move on the wheel axle side plate 51 so that the positioning part 531 is located in or out of the gear groove 521.

The second height adjustment device 50 further includes a pushing slider 55 arranged between the elastic component 54 and the operating component 53, and the wheel axle side plate 51 is provided with a housing hole 511 for housing the pushing slider 55 and the elastic component 54. In an embodiment of the disclosure, the housing hole 511 is T-shaped, and a width of an upper end of the housing hole 511 is greater than a width of a lower end thereof. The pushing slider 55 includes a mounting part 551 housed in the housing hole 511 and a resisting part 552 protruding and extending from the wheel axle side plate 51 to resist and match the operating component 53. A width of the mounting part 551 is slightly smaller than the width of the lower end of the housing hole 511, and a width of the resisting portion 552 is smaller than the width of the upper end of the housing hole 511 and larger than the width of the lower end of the housing hole 511.

In this embodiment, the elastic component 54 is a compression spring, a first end of the elastic component 54 elastically resists against a bottom of the housing hole 511 and a second end of the elastic component 54 elastically resists against a bottom of the pushing slider 55. The bottom of the housing hole 511 is provided with a protrusion block 510, and the first end of the elastic component 54 is sleeved on the protrusion block 510. A mounting groove (not shown) is arranged at the bottom of the pushing slider 55, and the second end of the elastic component 54 is arranged in the mounting groove. After the pushing slider 55 is assembled to the second height adjustment device 50, the pushing slider 55 is resisted by a lower end of the operating component 53, so that the pushing slider 55 can only move at the lower end of the housing hole 511, which means that it can only move at a bottom of the T-shaped hole, thereby preventing the pushing slider 55 from being out from the housing hole 511.

The operating component 53 includes the matching part 532 extending in the up and down direction and matched with the wheel axle side plate 51, the extension part 533 extending upward from the matching part 532, and the operating handle 534 extending upward from the extension part 533. The positioning part 531 is arranged on the matching part 532. The operating handle 534 is bent and extended in the horizontal direction perpendicular to the up and down direction to define a shape convenient for the user to operate. The extension part 533 is further away from the main body 10 in the horizontal direction than the matching part 532.

The matching part 532 is provided with a strip-shaped first sliding groove 535. A length direction of the first sliding groove 535 is parallel to a length direction of the extension part 533, the operating component 53 is connected with the wheel axle side plate 51 through the first sliding groove 535 and the operating component 53 is movable up and down. In this embodiment, there are two first sliding grooves 535, the two first sliding grooves 535 are arranged at intervals in the up and down direction, and the positioning part 531 is arranged between the two first sliding grooves 535. The two first sliding grooves 535 may increase a stability of a directional sliding of the operating component 53 and may reduce an occurrence of a side deviation of an end of the operating component 53 when sliding.

A strip-shaped second sliding groove 512 is arranged on the wheel axle side plate 51, a length direction of the second sliding groove 512 is parallel to a length direction of the wheel axle side plate 51, and a position of the second sliding groove 512 corresponds to a position of the positioning part 531. The positioning part 531 passes through the second sliding groove 512 and then matches the gear groove 521, and the positioning part 531 may move in the up and down direction in the second sliding groove 512.

The wheel axle side plate 51 is further provided with a protrusion part 513. There are two protrusion parts 513 correspondingly provided and arranged at intervals in the up and down direction. In this embodiment, each protrusion part 513 includes a protrusion column and a nut for locking and fixing the protrusion column. After the protrusion column passes through the corresponding first sliding grooves 535, the protrusion column is fixedly connected with the matching part 532 via the nut. Of course, when the operating handle 534 is pressed, the whole protrusion part 513 may move up and down along the first sliding groove 535, and the positioning part 531 may also move up and down along the second sliding groove 512 at the same time. The nut may adjust a friction force by adjusting a pressing force between the operating component 53 and the wheel axle side plate 51. When mounting, the nut may also be covered with a gasket, which may increase a contact area, reduce a pressure, prevent loosening and protect parts and screws.

The second height adjustment device 50 has a simple structure and is easy to operate. A compression spring may be used to realize a positioning between the operating component 53 and the wheel axle side plate 51. When in use, since the wheel axle side plate 51 is pivotally connected with the main body 10 of the mower through the pivot shaft 520 and the rear wheel 22 is pivotally connected with the bottom of the wheel axle side plate 51 through the connecting shaft 221, a synchronous height adjustment of the two rear wheels 22 may be realized by the following steps when the second height adjustment device 50 is operated: first, press down the operating component 53 to quickly separate the positioning part 531 from the gear groove 521, then turn the operating component 53 back and forth to enable the wheel axle side plate 51 rotate together, and at the same time, the rear wheel 22 pivotally connected with the wheel axle side plate 51 rotates synchronously; after selecting a suitable working height, release the operating component 53, under an action of a restoring force of the compression spring, the pushing slider 55 pushes the positioning part 531 to be quickly fixed with the corresponding gear groove 521, and a height adjustment between the pivot shaft 520 and the ground is realized at this time, which saves time and labor.

Figure 10:
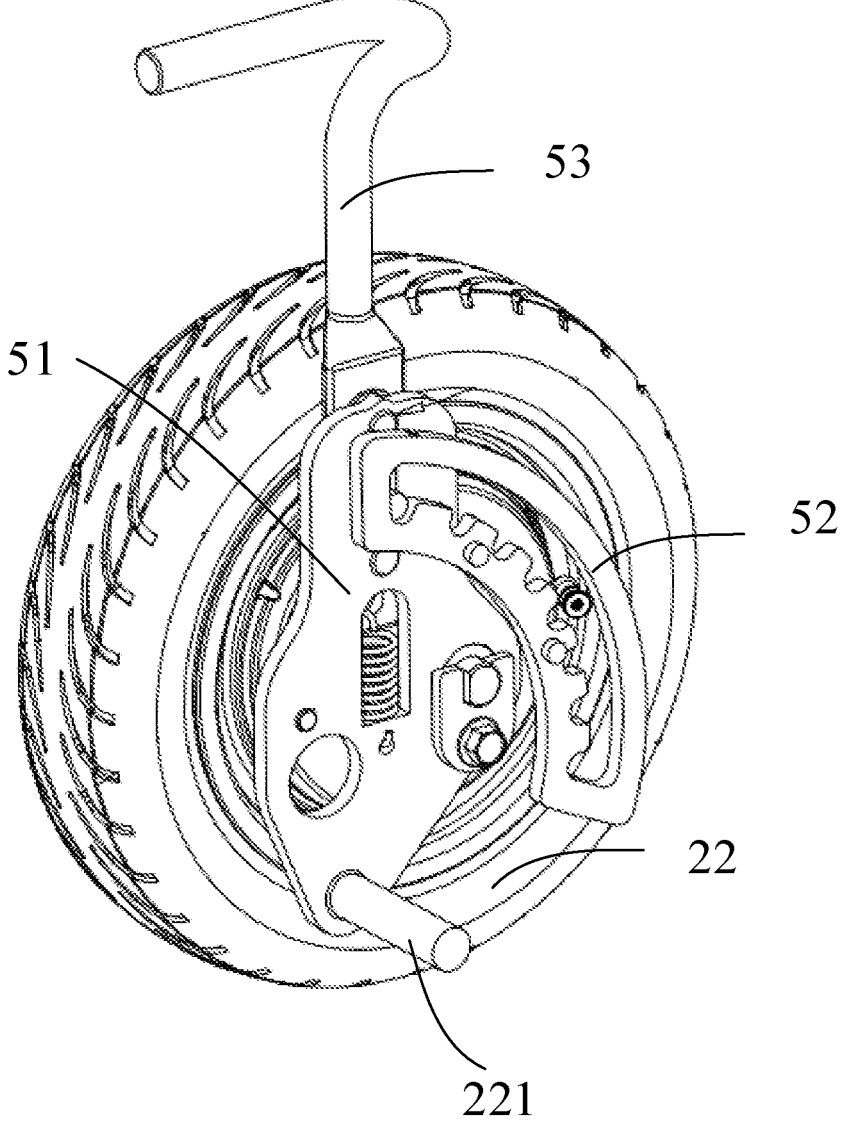
FIG. 10 is another perspective view of the second height adjustment device in FIG. 7.
Figure 11:
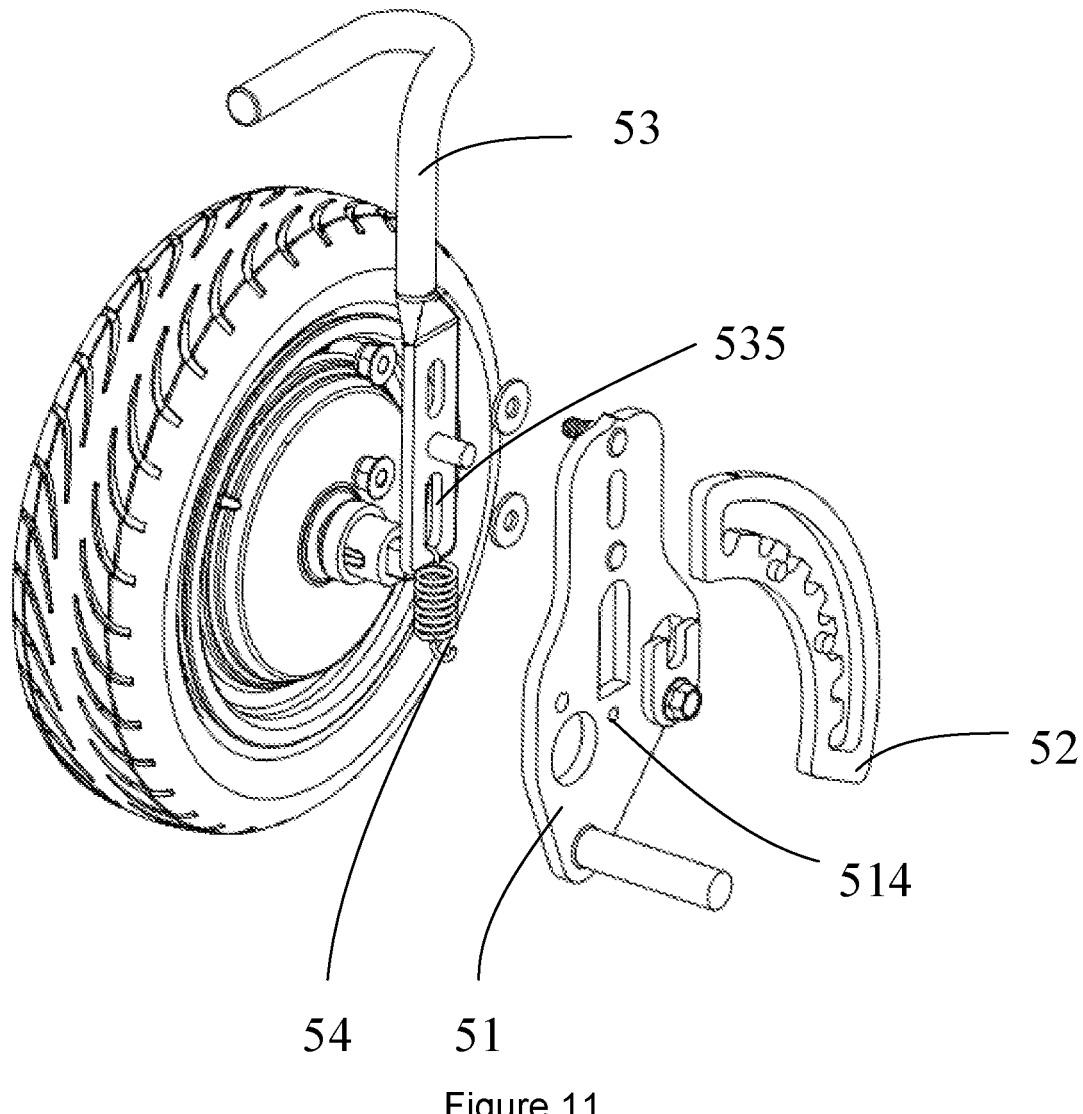
FIG. 11 is an exploded schematic view of the second height adjustment device shown in FIG. 10.

Please refer to FIG. 10 and FIG. 11, in another embodiment, the opening of the gear groove 521 may also face away from the ground. At this time, the elastic component 54 is a tension spring. The wheel axle side plate 51 is provided with a second through hole 514, one end of the tension spring is hooked with the second through hole 514, and the other end of the tension spring is hooked with the first sliding groove 535 on a side of the matching part 532 away from the operating handle 534. The housing hole 511 on the wheel axle side plate 51 is in an inverted U-shaped structure for housing the tension spring.

When in use, the user may lift the operating component 53 upward through the operating handle 534, so that the operating component 53 may slide along a length direction of the first sliding groove 535, then the positioning part 531 is separated from the gear groove 521 and abuts against an upper side wall of the gear plate 52. Subsequently, the operating component 53 is rotated back and forth, so that the operating component 53 and the wheel axle side plate 51 rotate along a fixed axis of the rear wheel shaft, and the positioning part 531 rotate to an upper side of the corresponding gear groove 521 according to actual use requirements. Then, when the operating handle 534 is released, the tension spring hooked with an end of the operating component 53 will enable the operating component 53 to automatically rebound, so that the positioning part 531 is embedded in the corresponding gear groove 521 to complete a chassis height adjustment operation.

In summary, the disclosure provides a mower and an outdoor work tool. The first height adjustment device 40 may be used to adjust a mowing height at a position of the front wheel 21 through arranging the first height adjustment device 40 at the front wheel 21, at the same time, the second height adjustment device 50 may be used to adjust the mowing height at a position of the rear wheel 22 through arranging the second height adjustment device 50 at the rear wheel 22, and has advantages of fast height adjustment, simple structure, safety and reliability. Therefore, the disclosure effectively overcomes various shortcomings in the conventional art and has a high industrial value.

The embodiments mentioned above only exemplarily illustrate the principles and effects of the disclosure, and are not used to limit the disclosure. Anyone familiar with this technology may modify or change the embodiments mentioned above without departing from the spirit and scope of the disclosure. Therefore, all equivalent modifications or changes made by those with ordinary knowledge in the technical field without departing from the spirit and technical ideas of the disclosure should still be covered by the claims of the disclosure.

What is claimed is:

1. A mower, comprising:

a main body, a traveling wheel assembly, carrying the main body and being capable of driving the main body to move on ground, the traveling wheel assembly comprising a wheel axle, a handle assembly, connected with the main body, a blade, a first height adjustment device, comprising:

a height adjustment fixing base, connected with the main body, the height adjustment fixing base being provided with a plurality of first through holes, and a second height adjustment device, comprising:

a wheel axle side plate, a bottom of the wheel axle side plate being fixedly connected with one end of a connecting shaft of the mower, and the other end of the connecting shaft being detachably connected with a rear wheel of the mower, a gear plate, arranged on one side of the wheel axle side plate and provided with a plurality of gear grooves with different heights, and an operating component, arranged on the other side of the wheel axle side plate, and being capable of being operated to match the plurality of the gear grooves with different heights, wherein the wheel axle connected with the mower is placeable in one of the plurality of the first through holes, and the wheel axle is non-rotatably housed in the one of the plurality of the first through holes;

the operating component comprises a positioning part passing through the wheel axle side plate and matched with the gear plate, and the operating component is operable to move on the wheel axle side plate to enable the positioning part to be located in or out of one of the plurality of the gear grooves;

the gear plate is arc-shaped, each of the plurality of the gear grooves is arranged on an inner wall of the gear plate along an arc-shaped direction of the gear plate, and an opening of each of the plurality of the gear grooves faces a ground direction, the second height adjustment device further comprises an elastic component elastically arranged between the operating component and the wheel axle side plate, the wheel axle side plate is provided with a housing hole to house the elastic component, a bottom of the housing hole is provided with a protrusion block, the elastic component is sleeved on the protrusion block, and one end of the elastic component abuts against the operating component.

2. The mower according to claim 1, wherein the first height adjustment device further comprises a fixing component, after the wheel axle passes through the first through hole, the fixing component is fixedly matched with a part of the wheel axle passing through the first through hole to connect the wheel axle with the height adjustment fixing base.

3. The mower according to claim 2, wherein the fixing component is a steel-ball pin, the wheel axle is correspondingly provided with a pin hole for the steel-ball pin to pass through, and a cross section of the steel-ball pin is D-shaped, O-shaped or square-shaped.

4. The mower according to claim 1, wherein the first through holes are arranged at intervals in an up and down direction, the wheel axle is capable of being matched with different first through holes to adjust different operation heights of the mower.

5. The mower according to claim 4, wherein the plurality of first through holes are arranged in two rows spaced at intervals in a horizontal direction, and the two rows of first through holes are staggered and arranged in a height direction.

6. The mower according to claim 4, wherein a cross section of the first through hole is D-shaped, and at least part of a cross section of the wheel axle is D-shaped corresponding to the cross section of the first through hole.

7. The mower according to claim 4, wherein the height adjustment fixing base is further provided with a holding part, the holding part is hung and extends from a top of the height adjustment fixing base toward the main body, a holding through hole is arranged on the holding part, and a fastener is inserted in the holding through hole to connect the holding part with the main body.

8. The mower according to claim 1, wherein the height adjustment fixing base is further provided with a protrusion to limit the main body in an up and down direction and a horizontal limiting step to limit the main body in a horizontal direction.

9. The mower according to claim 8, wherein the main body is provided with a concave part corresponding to the protrusion on the height adjustment fixing base, and the main body is further provided with a main body step corresponding to the horizontal limiting step on the height adjustment fixing base.

10. The mower according to claim 1, wherein a circular ring is arranged on the wheel axle, and the circular ring is located in a middle of the wheel axle to prevent the wheel axle from moving.

11. The mower according to claim 1, wherein the operating component further comprises a matching part extending in an up and down direction and matched with the wheel axle side plate, an extension part extending upward from the matching part, and an operating handle extending upward from the extension part, and the positioning part is arranged on the matching part.

12. The mower according to claim 11, wherein a strip-shaped first sliding groove is opened on the matching part, and the operating component is movably connected in the up and down direction with the wheel axle side plate through the first sliding groove, a protrusion column is arranged on the wheel axle side plate, and after the protrusion column passes through the first sliding groove, the protrusion column is connected with the operating member through a nut.

13. The mower according to claim 12, wherein there are two first sliding grooves, the two first sliding grooves are arranged at intervals in the up and down direction, there are two protrusion columns, the two protrusion columns are correspondingly arranged at intervals in the up and down direction, and the positioning part is arranged between the two first sliding grooves.

14. The mower according to claim 1, wherein the second height adjustment device further comprises a pushing slider arranged between the elastic component and the operating component, the housing hole on the wheel axle side plate is further used to house the pushing slider, and the pushing slider comprises a mounting part housed in the housing hole and a resisting part protruding from the wheel axle side plate to abut and match the operating component.

15. The mower according to claim 14, wherein the housing hole to house the elastic component and the pushing slider is T-shaped, and after the second height adjustment device is assembled, the pushing slider is only capable of moving at a lower end of the housing hole.

16. The mower according to claim 1, wherein a strip-shaped second sliding groove is arranged on the wheel axle side plate, after passing through the second sliding groove, the positioning part is matched with the gear plate, and the positioning part is capable of moving in an up and down direction in the second sliding groove.

17. An outdoor work tool, comprising:

a main body;

a traveling wheel assembly, carrying the main body and being capable of driving the main body to move on ground, the traveling wheel assembly comprising a wheel axle;

a handle assembly, connected with the main body;

a first height adjustment device, comprising:

a height adjustment fixing base, connected with the main body, the height adjustment fixing base being provided with a plurality of first through holes, and the plurality of the first through holes being separated from each other and parallel to each other, wherein the wheel axle connected with the outdoor work tool is placeable in one of the plurality of the first through holes, and the wheel axle is non-rotatably housed in the one of the plurality of the first through holes; and a second height adjustment device, comprising:

a wheel axle side plate, a bottom of the wheel axle side plate being fixedly connected with one end of a connecting shaft of the mower, and the other end of the connecting shaft being detachably connected with a rear wheel of the mower, a gear plate, arranged on one side of the wheel axle side plate and provided with a plurality of gear grooves with different heights, and an operating component, arranged on the other side of the wheel axle side plate, and being capable of being operated to match the plurality of the gear grooves with different heights, wherein the first height adjustment device and the second height adjustment device are respectively connected with a front traveling wheel and a rear traveling wheel of the outdoor work tool, so as to respectively realize an adjustment of a cutting height;

the gear plate is arc-shaped, each of the plurality of the gear grooves is arranged on an inner wall of the gear plate along an arc-shaped direction of the gear plate, and an opening of each of the plurality of the gear grooves faces a ground direction, the second height adjustment device further comprises an elastic component elastically arranged between the operating component and the wheel axle side plate, the wheel axle side plate is provided with a housing hole to house the elastic component, a bottom of the housing hole is provided with a protrusion block, the elastic component is sleeved on the protrusion block, and one end of the elastic component abuts against the operating component.

* * * * *